(12) United States Patent
Irani-Cohen

(10) Patent No.: US 11,469,897 B2
(45) Date of Patent: Oct. 11, 2022

(54) INTEGRATING BIOMETRIC DATA ON A BLOCKCHAIN SYSTEM

(71) Applicant: Biometric Blockchain, LLC, Newport Beach, CA (US)

(72) Inventor: Zackary Irani-Cohen, Newport Beach, CA (US)

(73) Assignee: Biometric Blockchain, LLC, Newport Beach, CA (US)

( * ) Notice: Subject to any disclaimer, the term of this patent is extended or adjusted under 35 U.S.C. 154(b) by 861 days.

(21) Appl. No.: 16/368,444

(22) Filed: Mar. 28, 2019

(65) Prior Publication Data

US 2019/0305956 A1 Oct. 3, 2019

Related U.S. Application Data

(60) Provisional application No. 62/650,649, filed on Mar. 30, 2018.

(51) Int. Cl.
| | |
|---|---|
| *H04L 29/06* | (2006.01) |
| *H04L 9/32* | (2006.01) |
| *G06Q 20/38* | (2012.01) |
| *G06Q 20/40* | (2012.01) |
| *G06Q 20/06* | (2012.01) |
| *H04L 9/00* | (2022.01) |

(52) U.S. Cl.
CPC ....... *H04L 9/3231* (2013.01); *G06Q 20/0658* (2013.01); *G06Q 20/389* (2013.01); *G06Q 20/40145* (2013.01); *H04L 9/3236* (2013.01); *G06Q 2220/00* (2013.01); *H04L 9/50* (2022.05); *H04L 2209/56* (2013.01)

(58) Field of Classification Search
None
See application file for complete search history.

(56) References Cited

U.S. PATENT DOCUMENTS

| | | | | |
|---|---|---|---|---|
| 2017/0352031 | A1* | 12/2017 | Collin | G06Q 30/0601 |
| 2019/0147431 | A1* | 5/2019 | Galebach | G06F 21/64 |
| | | | | 705/44 |
| 2019/0305956 | A1* | 10/2019 | Irani, III | G06Q 20/40145 |
| 2020/0293644 | A1* | 9/2020 | Tussy | G06Q 20/3276 |
| 2021/0073804 | A1* | 3/2021 | Kikinis | G06Q 20/3276 |
| 2021/0314328 | A1* | 10/2021 | Simons | G06N 20/00 |

(Continued)

OTHER PUBLICATIONS

International Preliminary Report on Patentability in International Appln. No. PCT/US2019/025001, dated Oct. 6, 2020, 7 pages.

(Continued)

*Primary Examiner* — Jeffery L Williams
(74) *Attorney, Agent, or Firm* — Fish & Richardson P.C.

(57) ABSTRACT

A method of initiating a transaction in a blockchain system includes receiving, by a processing device, biometric data associated with a first party of a transaction to be added to a block of a blockchain system. The method further includes providing the biometric data to a validation node of the blockchain system. The method further includes determining that the biometric data has been validated by the validation node. The method further includes, in response to determining that the biometric data has been validated, recording, by the processing device, the biometric data in the block of the blockchain system.

18 Claims, 6 Drawing Sheets

(56) References Cited

U.S. PATENT DOCUMENTS

2021/0352080 A1* 11/2021 Simons ................ H04L 9/3239
2021/0357893 A1* 11/2021 Kang ................ G06Q 20/0457

OTHER PUBLICATIONS

International Search Report and Written Opinion in International Appln. No. PCT/US2019/025001, dated Jul. 30, 2019, 9 pages.
International search report for application PCT/US2019/025001 dated Jul. 30, 2019.
Nandakumar Karthik et all Secure one-time biometrie tokens for non-repudiable multi-party transactions 2017 IEEE Workshop on Information Forensics and Security (WIFS) IEEE Dec. 4, 2017 (Dec. 4, 2017) pp. 1-6.

* cited by examiner

INTEGRATING BIOMETRIC DATA ON A BLOCKCHAIN SYSTEM

RELATED APPLICATIONS

This application claims priority to U.S. Provisional Patent Application No. 62/650,649 filed Mar. 30, 2018, the entire contents of which are hereby incorporated by reference herein.

TECHNICAL FIELD

Aspects of the present disclosure relate to the integration of biometric data on a blockchain system.

BACKGROUND

Blockchain systems provide a process for storing transactions in blocks and securing the blocks into a chain that maintains a record of the transactions. The records of transactions form a decentralized ledger. Various blockchain systems can use a number of nodes in a peer-to-peer network to validate new transactions and maintain a record of the transactions. Managed by the peer-to-peer network, blockchain allows for efficient and permanent recordkeeping.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
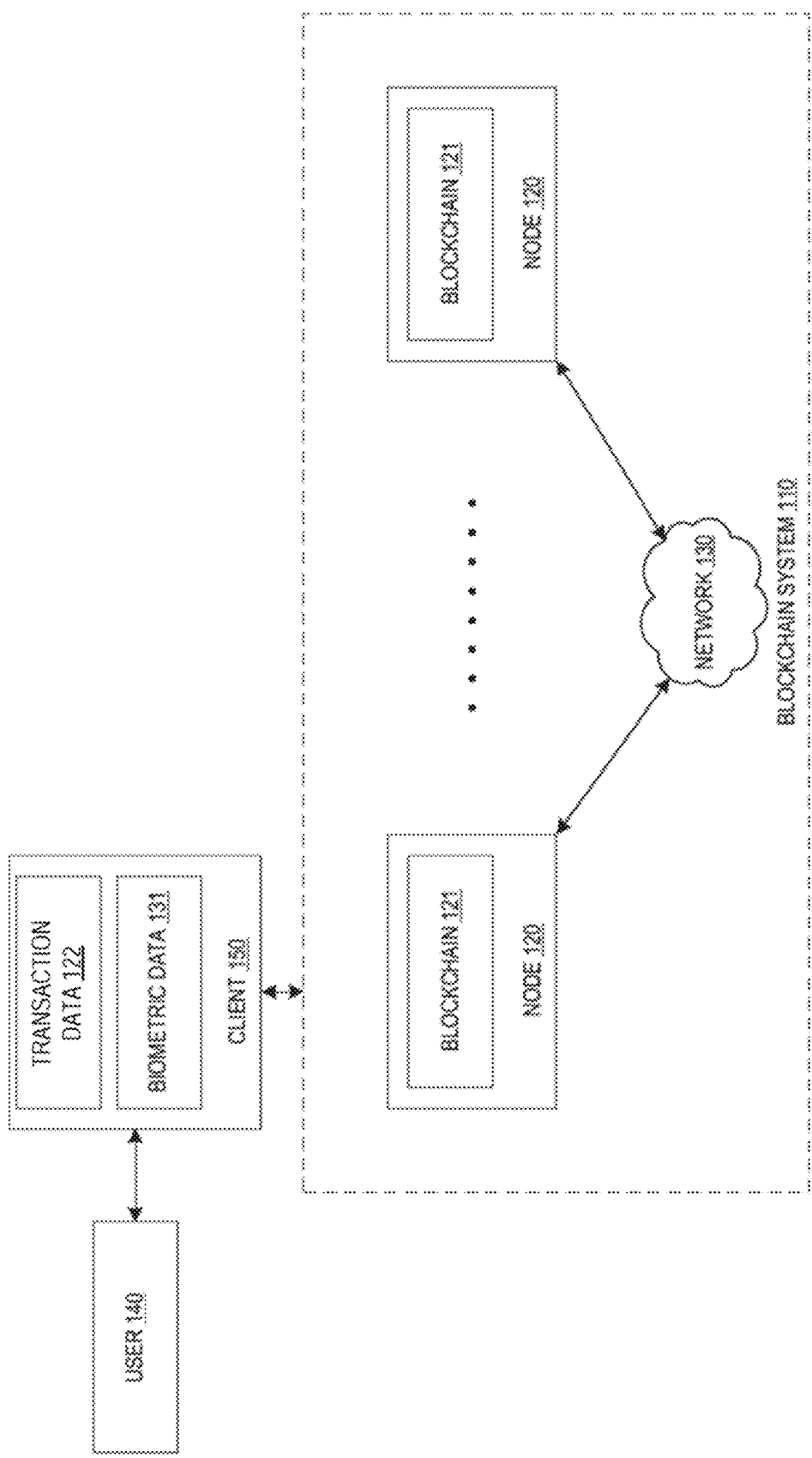
FIG. 1 is a block diagram that illustrates an example blockchain system, in accordance with some embodiments of the present disclosure.

Blockchain systems can store transactions in a manner that prevents the modification of those transactions after they have been stored. Some blockchain systems include multiple nodes that validate one or more transactions at a time to generate a block that contains the validated transactions. A hash function applied to each block can then generate a unique hash value for a block, which may be stored with the transactions in the block. As additional blocks are created, the hash values of each block can be used to ensure that stored transaction data is not modified by any party. Advantageously, if transaction data of a block has been modified, the hash function will no longer generate the known hash values for each subsequent block. In this way, the generation of blocks on a blockchain is capable of maintaining data integrity for a series of transactions.

In some embodiments, blockchain systems may maintain anonymity of users. Transactions in blockchain systems may include any amount and type of information. For example, a transaction in a blockchain system may list addresses (e.g., physical or digital) for each party to a transaction, a transaction ID, a value of the transaction, and/or any other suitable details. In one embodiment, the address used by a party for a transaction can be changed for each new transaction. Accordingly, each transaction can include a unique public key as an address, as well as a private key that a party to the transaction uses to sign the public key and generate a digital signature. The digital signature can then be confirmed by one or more additional nodes of the blockchain system to ensure that the value of the transaction is owned by the party initiating the transaction.

While this form of asymmetric cryptography may provide anonymity, it may also enable the use of cryptocurrencies built on blockchain systems for illegal or illicit transactions. Furthermore, this level of anonymity can prevent or discourage certain regulated entities from engaging in use of blockchain technologies. For example, bunking, medical, governmental, and other regulated industries can be prohibited from using blockchain systems for transactions because of record keeping requirements enforced by government agencies or industry standards.

In order to reduce potential issues from an anonymous blockchain system, described herein is a blockchain system that leverages biometric data from one or more of the parties to a transaction in order to provide access to the blockchain system. As described herein, biometric data may include any biometric data with some level of identifiability of an individual associated with a transaction. For example, biometric data may include a fingerprint data, iris/retinal data, facial data, blood-related data, any other suitable physiological data, or any combination of such data. The particular biometric data used may be selected based on characteristics of an individual that are unlikely to change, or change slowly, such that the biometric data will be useable for a period of time. Additionally, the biometric data should be specific enough to identify an individual over a period of time.

In one embodiment, biometric data from one or more parties to a transaction can be used in a variety of ways to improve the operation of a blockchain system. For example, in some embodiments, biometric data can be stored as part of the transaction to maintain a record of at least one of the parties involved. The biometric data can be simplified to a digital representation that provides appropriate characteristics before storing. In some embodiments, the biometric data may also be compressed, encrypted, or otherwise protected from unauthorized use when the transaction is recorded.

In some embodiments, stored biometric data for a transaction can be used by one or more approved nodes of a transaction when validating the transaction. For example, a bank may compare biometric data of a transaction to a known person associated with an address of a blockchain system in order to verify an identity of an approved user of the address. In some embodiments, the biometric data can be stored in an encrypted manner, such that only approved nodes can decrypt the biometric data to identify an individual.

In some embodiments, biometric data may be used within cryptocurrency wallets for identity verification of a user. For instance, a representation of biometric data can be provided to a biometric sensor and used by the wallet to identify an individual prior to enabling access to one or more addresses within the cryptocurrency wallet. In some embodiments, the wallet may include alternate security measures that enable recovery of addresses within the wallet when biometric data is no longer available. For example, biometric data may change with age, due to damage to a finger, eye, or face, due to death, or due to other circumstances. Thus, in some embodiments, addresses within a wallet may be recovered by providing evidence to an authorized node of identification other than the biometric data. In response, biometric data stored on the authorized node may be decrypted and used to unlock the wallet. Biometric data can be used in these and other embodiments to improve the operation of a blockchain system. Such embodiments are described further below with reference to the figures.

In some embodiments, blockchain systems can implement a blockchain-based cryptocurrency. In some embodiments, blockchain systems described herein may include transactions involving such cryptocurrency. In some embodiments, other information, such as information related to digital identification data, copyright and/or royalty data, real estate data, land data, title data, digital voting data, medical data (e.g., medical recordkeeping data), wills and inheritance data, asset data, logistics data, distributed storage system data, and the like can be stored in a blockchain using the systems and methods as described herein, with or without the use of a cryptocurrency. Additionally, some systems can be used to implement a cryptocurrency while also being used for one or more additional applications.

FIG. 1 is a block diagram that illustrates an example blockchain system 100, in accordance with some embodiments of the present disclosure. As illustrated in FIG. 1, the blockchain system 110 includes multiple nodes 120. The nodes 120 may be communicatively coupled to each other via a network 130. Network 130 may be a public network (e.g., the internet), a private network (e.g., a local area network (LAN) or wide area network (WAN)), or a combination thereof. In some embodiments, network 130 may include a wired or a wireless infrastructure, which may be provided by one or more wireless communications systems, such as a Wi-Fi® hotspot connected with the network 130 and/or a wireless carrier system that can be implemented using various data processing equipment, communication towers (e.g. cell towers), etc. The network 130 may carry communications (e.g., data, messages, packets, frames, etc.) between the nodes 120.

In some embodiments, a node 120 may be a combination of one or more computing devices. A computing device may be any suitable type of computing device or machine that has a programmable processor including, for example, server computers, desktop computers, laptop computers, tablet computers, smartphones, set-top boxes, etc. In some examples, a computing device may be a single machine or may be multiple interconnected machines (e.g., multiple server computers configured in a cluster). A node 120 may also be a virtual machine that may execute on top of the host operating system of a computing device.

In some embodiments, each node 120 includes a copy of a blockchain 121. Each copy of the blockchain 121 may be stored in a data store of a respective node 120. In some embodiments, one or more nodes 120 may not include a full copy of the blockchain 121. For example, some nodes 120 may store only a portion of the blockchain 121. The blockchain system 110 can store a record of transactions in the blockchain 121. For example, the blockchain 121 may record transactions between different parties that include transfer of a cryptocurrency. A cryptocurrency may be a digital asset that uses cryptography to secure and verify transactions that use the cryptocurrency. Transferring of the cryptocurrency and creating new units of the cryptocurrency may be secured using various cryptographic functions. The blockchain 121 may serve as the record of the transactions for the cryptocurrency. The blockchain 121 may also be referred to as a ledger, a distributed ledger, a distributed blockchain, or the like. In other embodiments, blockchain 121 may store transactions associated with digital identification data, copyright and/or royalty data, real estate data, land data, title data, digital voting data, medical data (e.g., medical recordkeeping data), wills and inheritance data, asset data, logistics data, distributed storage system data, etc.

In some embodiments, the blockchain 121 includes blocks of transactions and at least some of the transactions may include biometric data 131 associated with a part of a transaction. For example, a user 140 may initiate a transaction in the blockchain system 110. The user 140 can initiate the transaction using a client 150 that includes a number of addresses, private keys, public keys, or the like. In some embodiments, the client 150 may be a cryptocurrency wallet. In other non-cryptocurrency embodiments, the client 150 may be any client device capable of accessing the blockchain system 110. The client 150 may be hosted on a computer system of the user or on a remote system. In some embodiments, the client 150 can be a stand-alone computing device that connects to network 130 to initiate a transaction within the blockchain system 110.

The client 150 may store and provide transaction data 122 associated with a transaction to be added to the blockchain 121 of blockchain system 110. In some embodiments, the client 150 may also include a record of biometric data 131 associated with the user. The biometric data 131 can include any biometric data that can provide some level of identification of a user 140. In some embodiments, the client 150 may include one or more biometric sensors that acquire biometric data 131 by sensing features of the user 140. For example, a biometric sensor may include a fingerprint scanner, an iris/retinal scanner, a facial scanner, an imaging device, and/or other sensors that can generate biometric data 131 from a user 140. In some embodiments, the user 140 may have a separate biometric sensor that then provides biometric data to the client 150. In a variety of embodiments, client 150 may receive biometric data from any device, internal or external to client 150.

In one embodiment, the client 150 may initiate a transaction (e.g., corresponding to transaction data 122) in the blockchain system 110 by providing a public key, such as an address, and a digital signature to demonstrate ownership of cryptocurrency (or other data) at the address. In some embodiments, the client 150 verifies an identity of the user 140 using the biometric data 131 prior to initiating a transaction. In some embodiments, the client 150 provides the biometric data 131 to blockchain system 110 in a request to initiate a transaction. The blockchain system 110 may then validate the transaction using previous transactions stored in the blockchain 121. In some embodiments, the one or more nodes 120 of the blockchain system 10 may also use the biometric data 131 to validate the transaction.

After the transaction is validated, the nodes 120 may store the transaction data 122 in a new or current block of the blockchain 121. In some embodiments, the biometric data 131 can also be stored in the blockchain 121 along with additional details (e.g., transaction data 122) of the transaction. Because sharing of biometric data 131 could prevent the privacy of users of blockchain system 110, the biometric data 131 may be encrypted or otherwise obscured for use by the blockchain system 110. For example, biometric data 131 may be encrypted by the client 150 before initiating a transaction, by a node 120 before storing the transaction, or at other times throughout processing a transaction. In some embodiments, one or more nodes 120 or other entities with access to the blockchain 121 may have access to a decryption key that enables access to the biometric data 131 or an algorithm from which biometric data 131 can be reproduced from an obscured value. Additionally, to reduce the size of the blockchain 121, in some embodiments, biometric data 131 can be compressed prior to storage. Thus, to access biometric data 131, nodes 120 or another entity accessing the blockchain 121 may decompress and/or decrypt the biometric data 131.

In some embodiments, different nodes 120 may perform different transaction-validation operations. For example, the client 150 or user 140 may be associated with one or more of the nodes 120. The node(s) 120 associated with the client 150 or user 140 may have access to a private key for decrypting biometric data 131 associated with the transaction. That node 120 may provide validation of the biometric data 131 as compared to records of the node. Additional nodes 120 may provide validation of the additional transaction details (e.g., transaction data 122). For example, additional nodes 120 can provide validation by a sufficient (e.g., threshold) number of the nodes verifying the transaction is valid according to previous records in the blockchain 121. Thus, in some embodiments, the transaction may receive different validation results from certain nodes 120 than from others. In some embodiments, the transaction may also include a record (e.g., identifier) of a node 120 associated with the user 140 or client 150.

Figure 2:
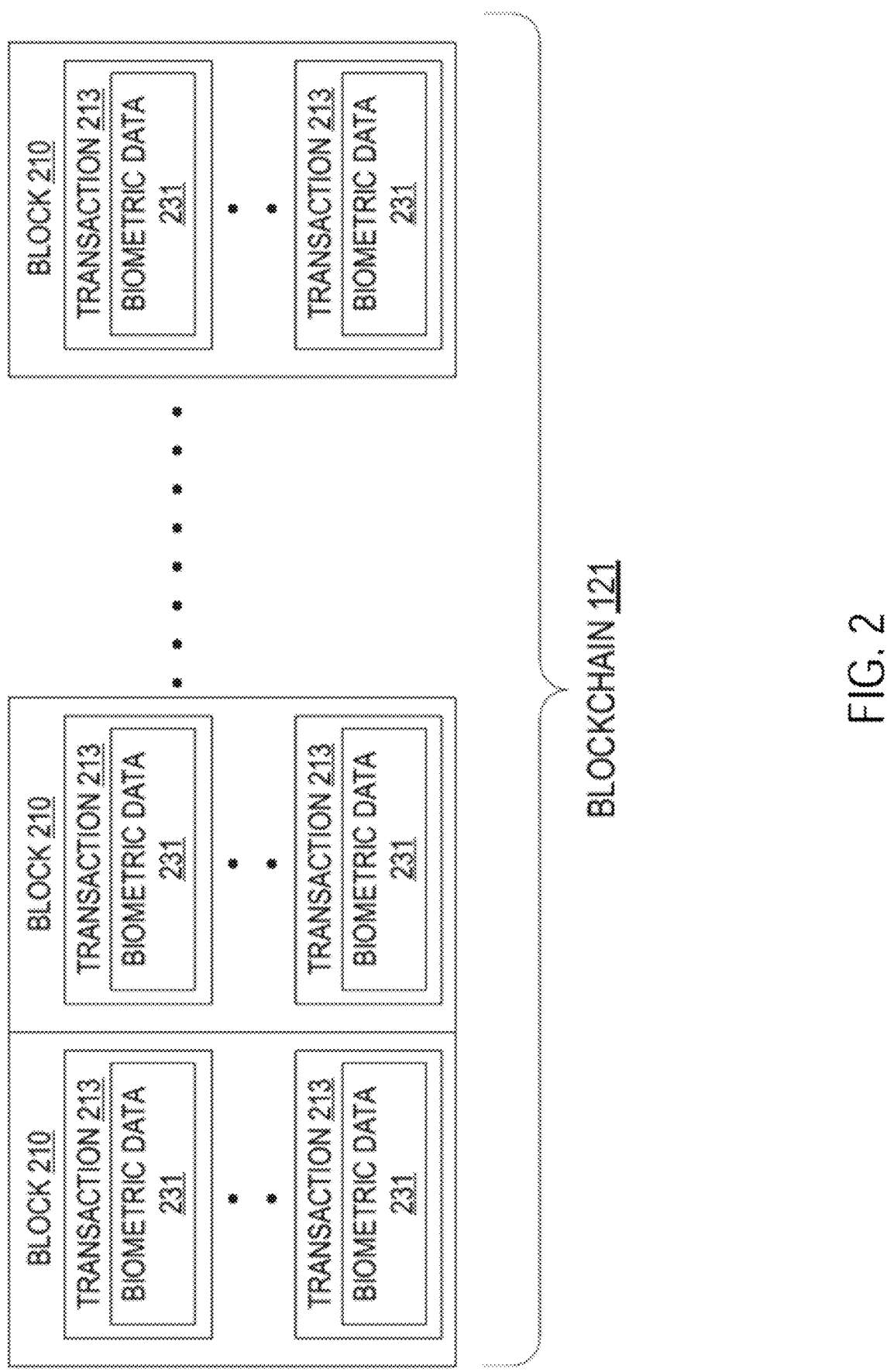
FIG. 2 is a block diagram that illustrates an example blockchain, in accordance with some embodiments of the present disclosure.

FIG. 2 is a block diagram that illustrates an example blockchain 121, in accordance with some embodiments of the present disclosure. The blockchain 121 may also be referred to as a ledger, a distributed ledger, a distributed blockchain, etc. As discussed above, blockchain 121 may be used by a blockchain system to maintain a record of transactions of a cryptocurrency or other data. Copies of the blockchain 121 may be stored on multiple nodes of a blockchain system. For example, referring to FIG. 1, each node 120 of the blockchain system 110 may store a copy of the blockchain 121, as discussed above.

As illustrated in FIG. 2, the blockchain 121 includes multiple blocks 210. Each block 210 includes a record of transactions 213. In some embodiments, at least some of the transactions 213 may include biometric data of one or more parties of the transaction 213. For example, biometric data may be recorded for an initiating party, receiving parties, intervening parties, or all parties to a transaction 213. Each block 210 may include a hash of a previous block 210 that is computed based on a hash of the transactions 213 recorded in the previous block 210. In some embodiments, the biometric data 231 stored in at least some of the transactions 213 may be encrypted to protect an individual's privacy and/or compressed to improve storage efficiency of the system. In some embodiments, additional identifying information may also be stored, either encrypted or unencrypted, in relation to a transaction 213.

Figure 3:
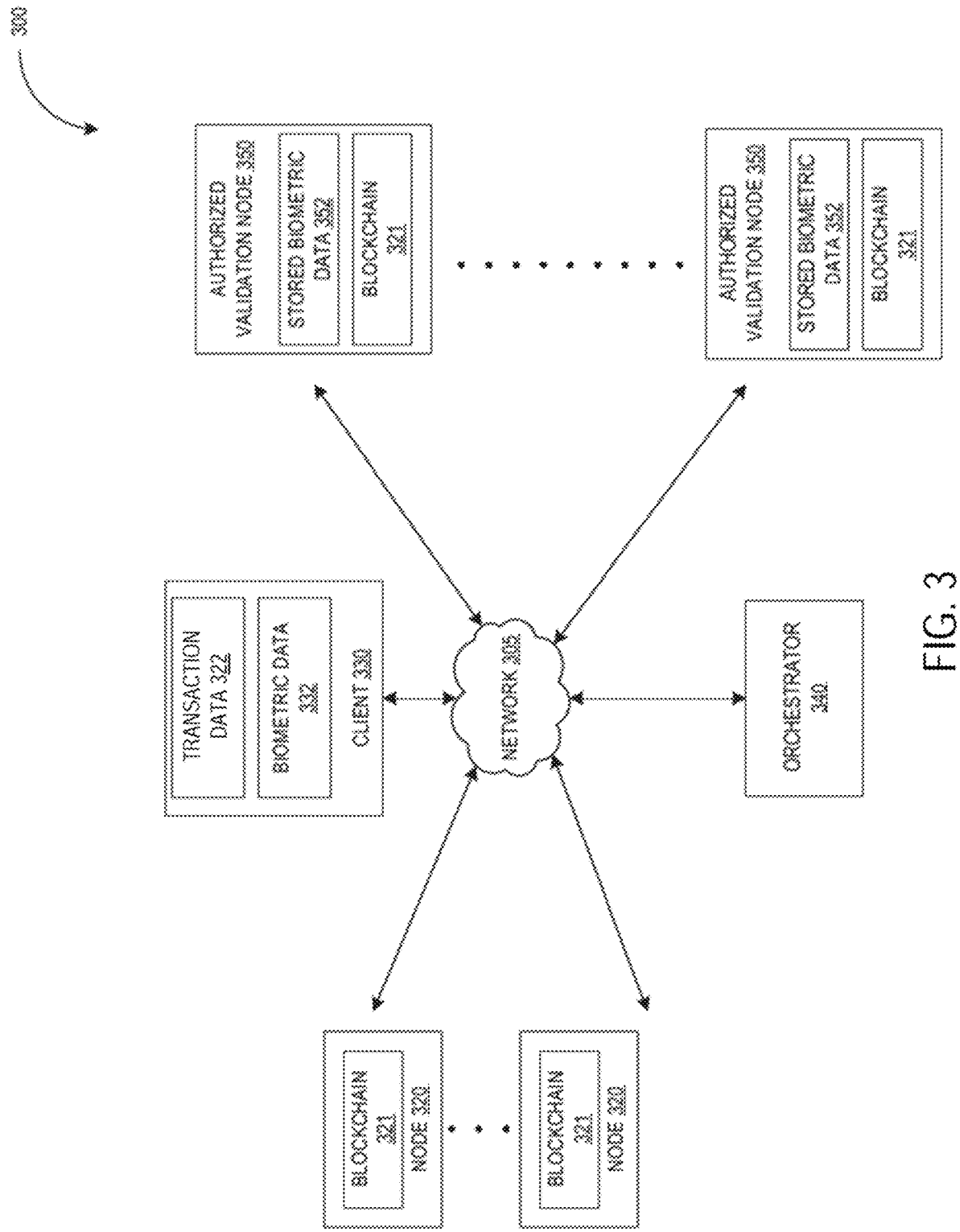
FIG. 3 is a block diagram that illustrates an example blockchain system, in accordance with some embodiments of the present disclosure.

FIG. 3 is a block diagram that illustrates a blockchain system 300, in accordance with some embodiments of the present disclosure. The blockchain system 300 may include a number of nodes 320. In some embodiments, system 300 may include authorized validation nodes 350 to perform similar or additional tasks as those performed by nodes 320. The blockchain system 300 may include one or more orchestrator nodes (e.g., orchestrator 340) to route transactions, hashes, stored blocks, or other data through the blockchain system 300. For example, the orchestrator 340 may determine one or more nodes 320 of the system, to which to route a transaction for validation.

In one embodiment, the blockchain system 300 may receive a transaction initiation, including transaction data, from a client 330. The transaction data can include an address of another party to the transaction. In a variety embodiments, the transaction data 322 may include an amount of cryptocurrency to transfer in the transaction, digital identification data, copyright and/or royalty data, real estate data, land data, title data, digital voting data, medical data (e.g., medical recordkeeping data), wills and inheritance data, asset data, logistics data, distributed storage system data, etc. In some embodiments, the client 330 may include biometric data 332 as transaction data 322 (or in addition to transaction data 322) when initiating a transaction. The transaction data 322 from the client 330 can be routed (e.g., by orchestrator 340) through network 305 to one or more nodes 320, authorized validation nodes 350, or other entities. In some embodiments, all nodes 320 in a system are presented with transaction details (e.g., transaction data 322) for validation. The transaction can then be validated after all nodes 320 have validated the transaction or a threshold number of nodes 320 have validated the transaction. In other embodiments, a subset of nodes 320 receive and validate transactions.

In some embodiments, biometric data 332 may be provided with the transaction data 322. Certain authorized validation nodes 350 may then use the biometric data 332 to compare against stored biometric data 352. In some embodiments, each authorized validation node 350 may have stored biometric data 352 for each user of the blockchain system 300. Advantageously, stored biometric data 352 may also be stored in a blockchain (e.g., a separate blockchain from that of blockchain system 300). In some embodiments, the authorized validation nodes 350 may have stored biometric data 352 of only users that have an association or affiliation with the authorized validation nodes. For example, a financial institution such as a bank may have stored biometric data 352 of customers of the bank. Such stored biometric data 352 may be stored in a separate blockchain maintained by (and private to) the bank.

In some embodiments, an authorized validation node 350 may validate a transaction based on the transaction data 322 as well as the biometric data 332 received with the transaction. As discussed above, the biometric data 332 may be converted to an encrypted and/or compressed format for which the authorized validation node 350 has a decryption/decompression key. Thus, the authorized validation node 350 may decrypt the biometric data 332 for comparison to stored biometric data 352 that is not accessible to other nodes 320.

In some embodiments, all the nodes in the blockchain system 300 can be regular nodes 320 or authorized validation nodes 350. Thus, validation may be performed without confirmation of biometric data 332 in some embodiments. Furthermore, in some embodiments, transactions may be validated using transaction data 322 that include biometric data 332. In some embodiments, validation may include a combination of validating transaction data 322 by nodes 320 as well as validation of biometric data 332 by comparison to stored biometric data 352 for a user associated with the transaction.

In some embodiments, after validation, biometric data 332 may be stored in a block of blockchain 321 with the additional transaction data 322. The biometric data 332 can be encrypted and/or compressed when it is stored in the blockchain 321. Furthermore, in some embodiments, an identification of a user that initiated the transaction can be stored in the transaction data. For example, an authorized validation node 350 can store a unique identifier for the user that can be used to track transactions within the blockchain 321. In some embodiments, such a unique identifier may obscure the actual identity of a user, but can be used by one or more of the authorized validation nodes 350 to determine the identification of the user in case tracing the identity of the user is useful and authorized. In some embodiments, the biometric data 332 is formatted in a manner unique to the user, such as a unique representation of the user's fingerprint, so that the biometric data 332 can act as the unique identifier of the user when tracing transactions.

Figure 4A:
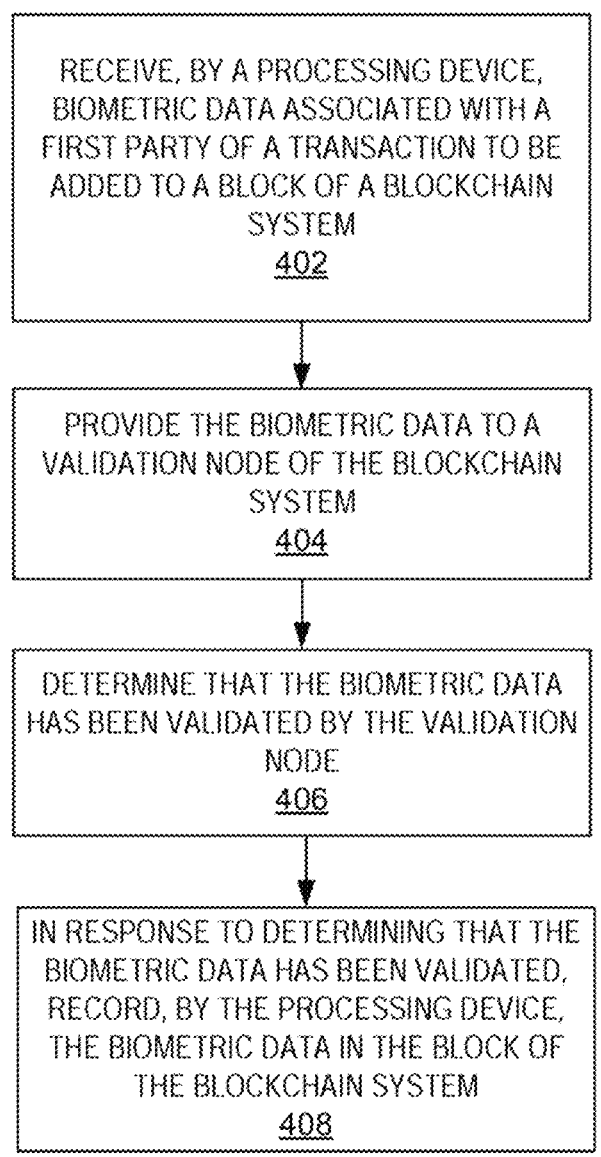
FIG. 4A is a first flow diagram of a method of integrating biometric data in a blockchain, in accordance with some embodiments of the present disclosure.

FIG. 4A is a first flow diagram of a method 400A of integrating biometric data in a blockchain system, according to some embodiments of the present disclosure. Method 400A may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400A may be performed by a blockchain system as described with reference to FIGS. 1-3 above.

Beginning at block 402, processing logic receives, by a processing device, biometric data associated with a first party of a transaction to be added to a block of a blockchain system. In one embodiment, biometric data corresponds to one or more of: a fingerprint scan, an iris or retinal scan, or a facial scan. In other embodiments, any other form of suitable biometric data may be used. In some embodiments, the biometric data may be included in a request from which the transaction is initiated. In some embodiments, the blockchain system may validate transaction data before receiving biometric data from the first party. Furthermore, in some embodiments, the blockchain system may receive biometric data from additional parties to the transaction. In some embodiments, the biometric data may be received in an encrypted and/or compressed format.

At block 404, processing logic provides the biometric data to a validation node of the blockchain system. For example, the blockchain system may provide the biometric data to each node in a system. In some embodiments, the blockchain may provide the biometric data to a subset of validation nodes. For example, transactions may be distributed to only validation nodes associated with one or more parties of the transaction, to particular authorized validation nodes based on a random or round robin distribution scheme, or in another manner.

At block 406, processing logic determines that the biometric data has been validated by the validation node. For example, processing logic may determine that the biometric data has been validated based on all or a portion of the nodes receiving the biometric data validating the data. At block 408, processing logic, in response to determining that the biometric data has been validated, records, by the processing device, the biometric data in the block of the blockchain system.

In some embodiments, the blockchain system may use transaction details of addresses within the blockchain system and/or the biometric data to validate the transaction. In some embodiments, the transaction details alone can be used by one or more nodes to validate the system. Furthermore, in some embodiments, the biometric data may be validated by a subset of nodes while the transaction details are validated by a different subset of nodes.

For example, processing logic may provide transaction data of the transaction to a node of the blockchain system and determine that the transaction data has been validated by the node. In one embodiment, the node is separate from the validation node used to validate the biometric data. In other embodiments, the same nodes may be used to validate both the transaction data and the biometric data. In some embodiments, the transaction data may include addresses for sending and receiving cryptocurrency within a blockchain system. The transaction data may also include one or more digital signatures. In response to determining that the transaction data and the biometric data has been validated, processing logic may record the biometric data and the transaction data in the block of the blockchain system. In one embodiment, processing logic may record an identity of the first party in the block of the blockchain system.

In some embodiments, the biometric data may be encrypted and/or compressed before recording to the blockchain. Advantageously, this can protect the privacy of parties to the transaction. In some embodiments, the encryption keys used to decrypt/decompress the biometric data may be secured by one or more nodes having a relationship with one of the parties. An indication of the identity of such nodes may also be stored in the transaction data of the blockchain or may be evident from the addresses used in the transaction.

The embodiments described herein may store and utilize any amount of biometric data associated with any number of suitable parties. For example, in one embodiment, processing logic may receive second biometric data associated with a second party of the transaction (e.g., a buyer in a buy-sell transaction). Processing logic may then providing the second biometric data to the validation node, and, in response to determining that the second biometric data has been validated, record the second biometric data in the block of the blockchain system.

Figure 4B:
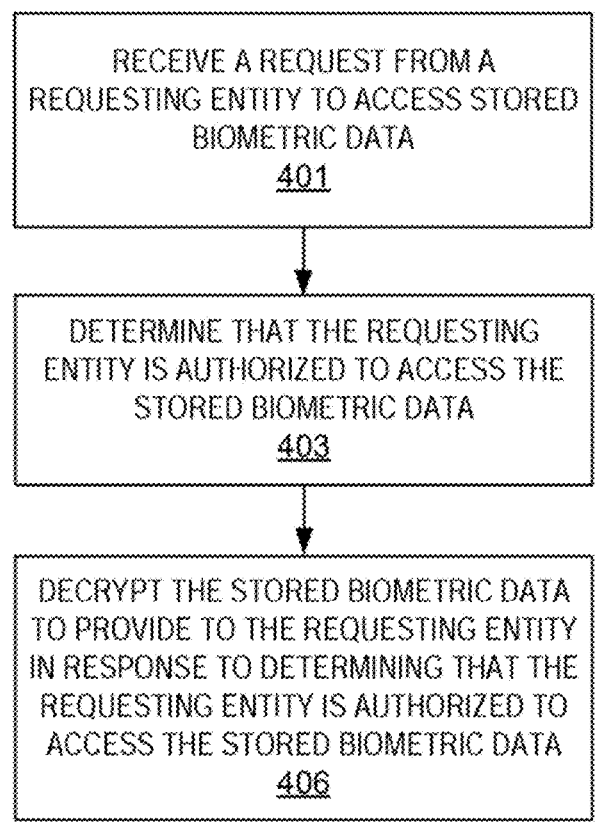
FIG. 4B is a second flow diagram of a method of integrating biometric data in a blockchain, in accordance with some embodiments of the present disclosure.

FIG. 4B is a second flow diagram of a method 400B of integrating biometric data in a blockchain system, according to some embodiments of the present disclosure. Method 400B may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400B may be performed by a blockchain system as described with reference to FIGS. 1-3 above.

In one embodiment, the operations of method 400B may allow for accessing the transaction data on the blockchain system using the biometric data. For example, beginning at block 401, processing logic receives a request from a requesting entity to access stored biometric data. At block 403, processing logic determines that the requesting entity is authorized to access the stored biometric data. To determine whether the requesting entity is authorized to access the stored biometric data, any number of techniques may be used. For example, in one embodiment, processing logic may compare the requesting entity to a database of entities that are authorized to access the stored biometric data. In another embodiment, processing logic may determine that the stored biometric data is stored by a particular entity, and allow that entity unrestricted access.

At block 405, processing logic decrypts the stored biometric data to provide to the requesting entity in response to determining that the requesting entity is authorized to access the stored biometric data. In one embodiment, accessing the stored transaction data includes accessing a cryptocurrency wallet. In other embodiments, any other type of data and associated platform may be accessed.

Figure 5:
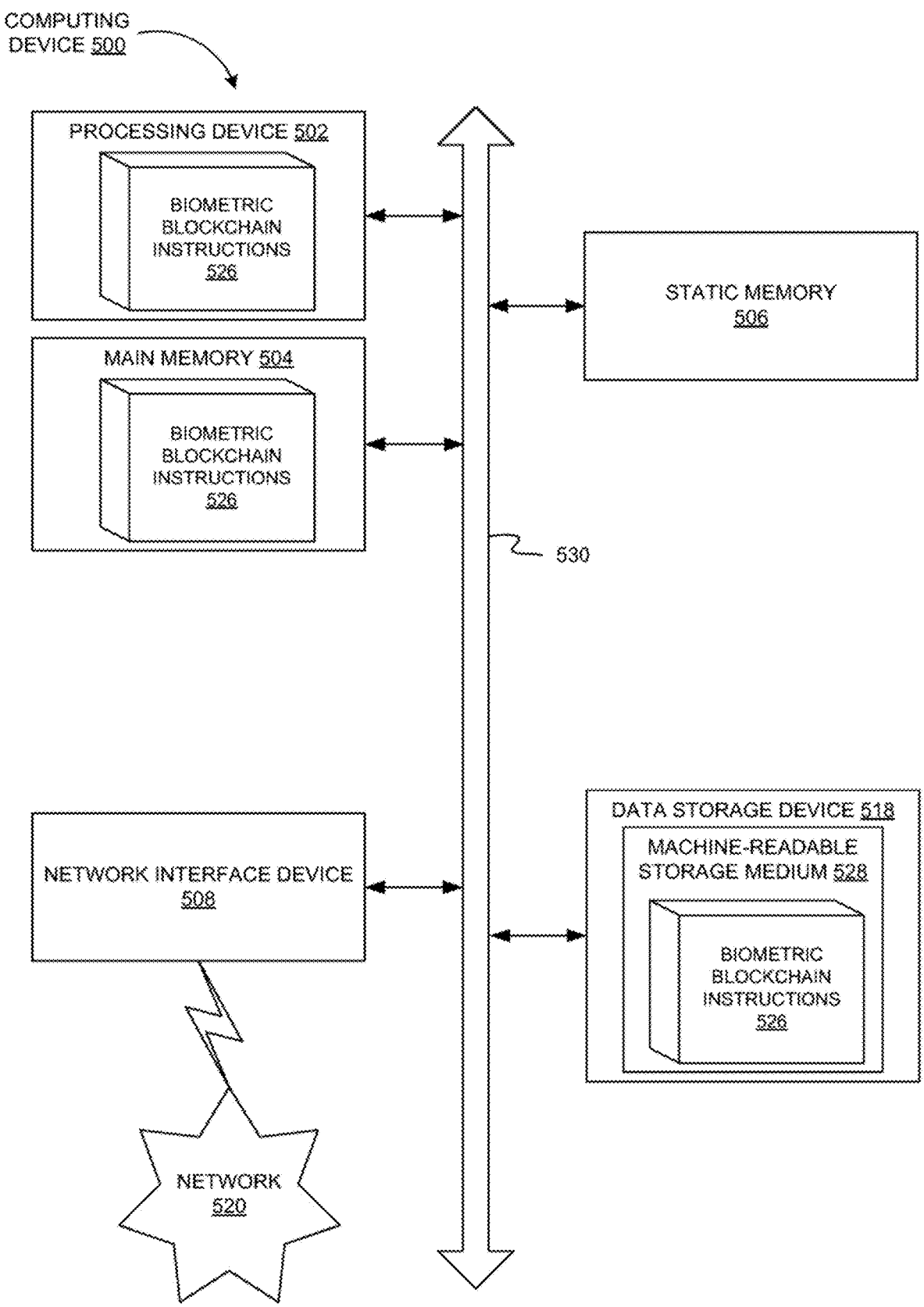
FIG. 5 is a block diagram of an example computing device that may perform one or more of the operations described herein, in accordance with some embodiments of the present disclosure.

FIG. 5 illustrates a diagrammatic representation of a machine in the example form of a computer system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 500 may be representative of a blockchain system, such as blockchain system 110 of FIG. 1, configured to perform the operations described herein.

The exemplary computer system 500 includes a processing device 502, a main memory 504 (e.g., read-only memory (ROM), flash memory, dynamic random access memory (DRAM), a static memory 506 (e.g., flash memory, static random access memory (SRAM), etc.), and a data storage device 518, which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute biometric blockchain instructions 526, for performing the operations and steps discussed herein.

The data storage device 518 may include a non-transitory computer-readable storage medium 528, on which is stored one or more set of instructions 526 (e.g., software) embodying any one or more of the methodologies of functions described herein, including instructions to cause the processing device 502 to perform the operations described herein. The instructions 526 may also reside, completely or at least partially, within the main memory 504 or within the processing device 502 during execution thereof by the computer system 500; the main memory 504 and the processing device 502 also constituting machine-readable storage media. The instructions 526 may further be transmitted or received over a network 520 via the network interface device 508.

The non-transitory computer-readable storage medium 528 may also be used to store instructions 526 to perform one or more operations, as described herein. While the non-transitory computer-readable storage medium 528 is shown in an exemplary embodiment to be a single medium, the term "computer-readable storage medium" should be taken to include a single medium or multiple media (e.g., a centralized or distributed database, or associated caches and servers) that store the one or more sets of instructions. A computer-readable medium includes any mechanism for storing information in a form (e.g., software, processing application) readable by a machine (e.g., a computer). The computer-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method, comprising:
   receiving, by a processing device, biometric data associated with a first party of a transaction to be added to a block of a blockchain system;
   providing the biometric data to a validation node of the blockchain system;
   determining that the biometric data has been validated by the validation node;
   in response to determining that the biometric data has been validated, recording, by the processing device, the biometric data in the block of the blockchain system;
   receiving second biometric data associated with a second party of the transaction;
   providing the second biometric data to the validation node; and
   in response to determining that the second biometric data has been validated, recording the second biometric data in the block of the blockchain system.

2. The method of claim 1, further comprising:
   providing transaction data of the transaction to a node of the blockchain system;
   determining that the transaction data has been validated by the node; and
   in response to determining that the transaction data and the biometric data has been validated, recording the biometric data and the transaction data in the block of the blockchain system.

3. The method of claim 2, wherein the node is separate from the validation node.

4. The method of claim 2, wherein recording the biometric data and the transaction data comprises encrypting at least one of: the biometric data or the transaction data before recording in the block of the blockchain system.

5. The method of claim 1, further comprising recording an identity of the first party in the block of the blockchain system.

6. The method of claim 1, further comprising accessing transaction data for the transaction on the blockchain system using the biometric data.

7. The method of claim 6, wherein accessing the transaction data on the blockchain system using the biometric data comprises:
   receiving a request from a requesting entity to access stored biometric data;
   determining that the requesting entity is authorized to access the stored biometric data; and
   decrypting the stored biometric data to provide to the requesting entity in response to determining that the requesting entity is authorized to access the stored biometric data.

8. The method of claim 6, wherein accessing the stored transaction data comprises accessing a cryptocurrency wallet.

9. The method of claim 1, wherein the biometric data corresponds to one or more of: a fingerprint scan, an iris or retinal scan, or a facial scan.

10. A system, comprising:
    a memory device; and
    a processing device operatively coupled to the memory device, the processing device to:
       receive biometric data associated with a first party of a transaction to be added to a block of a blockchain system;
       provide the biometric data to a validation node of the blockchain system;
       determine that the biometric data has been validated by the validation node;
       in response to determining that the biometric data has been validated, record the biometric data in the block of the blockchain system;
       receive second biometric data associated with a second party of the transaction;
       provide the second biometric data to the validation node; and
       in response to determining that the second biometric data has been validated, record the
    second biometric data in the block of the blockchain system..

11. The system of claim 10, the processing device further to:
    provide transaction data of the transaction to a node of the blockchain system;
    determine that the transaction data has been validated by the node; and
    in response to determining that the transaction data and the biometric data has been validated, record the biometric data and the transaction data in the block of the blockchain system.

12. The system of claim 11, wherein the node is separate from the validation node.

13. The system of claim 11, wherein to record the biometric data and the transaction data the processing device is further to encrypt at least one of: the biometric data or the transaction data before recording in the block of the blockchain system.

14. The system of claim 10, the processing device further to record an identity of the first party in the block of the blockchain system.

15. The system of claim 10, the processing device further to:
   receive a request from a requesting entity to access stored biometric data;
   determine that the requesting entity is authorized to access the stored biometric data; and
   decrypt the stored biometric data to provide to the requesting entity in response to determining that the requesting entity is authorized to access the stored biometric data.

16. The system of claim 10, wherein the biometric data corresponds to one or more of: a fingerprint scan, an iris or retinal scan, or a facial scan.

17. A non-transitory computer-readable storage medium including instructions that, when executed by a processing device, cause the processing device to:
   receive, by the processing device, biometric data associated with a first party of a transaction to be added to a block of a blockchain system;
   provide the biometric data to a validation node of the blockchain system;
   determine that the biometric data has been validated by the validation node;
   in response to determining that the biometric data has been validated, record, by the processing device, the biometric data in the block of the blockchain system;
   receive second biometric data associated with a second party of the transaction;
   provide the second biometric data to the validation node; and
   in response to determining that the second biometric data has been validated, record the second biometric data in the block of the blockchain system.

18. The non-transitory computer-readable storage medium of claim 17, the processing device further to:
   receive a request from a requesting entity to access stored biometric data;
   determine that the requesting entity is authorized to access the stored biometric data; and
   decrypt the stored biometric data to provide to the requesting entity in response to determining that the requesting entity is authorized to access the stored biometric data.

* * * * *